United States Patent
Kadowaki et al.

(10) Patent No.: US 7,419,733 B2
(45) Date of Patent: Sep. 2, 2008

(54) FUEL CELL SYSTEM HAVING A BURNER WITH A FLAME DETECTION ROD THEREIN

(75) Inventors: Masataka Kadowaki, Moriguchi (JP); Akira Fuju, Moriguchi (JP); Yasuo Miyake, Moriguchi (JP); Masatoshi Ueda, Moriguchi (JP); Keigo Miyai, Moriguchi (JP); Yukinori Akiyama, Moriguchi (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 173 days.

(21) Appl. No.: 10/371,186

(22) Filed: Feb. 24, 2003

(65) Prior Publication Data

US 2004/0048117 A1    Mar. 11, 2004

(51) Int. Cl.
*H01M 8/06* (2006.01)
*H01M 8/04* (2006.01)

(52) U.S. Cl. .......................... 429/20; 429/12
(58) Field of Classification Search .............. 429/12, 429/20; 431/12, 75, 76; 340/579
See application file for complete search history.

(56) References Cited

U.S. PATENT DOCUMENTS

| | | | | |
|---|---|---|---|---|
| 3,914,088 A | * | 10/1975 | Huyck ...................... | 431/5 |
| 4,943,493 A | * | 7/1990 | Vartanian ................... | 429/17 |
| 5,628,628 A | * | 5/1997 | Kim et al. .................. | 431/208 |
| 6,183,895 B1 | * | 2/2001 | Kudo et al. ................. | 429/20 |
| 6,585,940 B2 | | 7/2003 | Abe et al. | |
| 6,749,958 B2 | * | 6/2004 | Pastula et al. .............. | 429/26 |
| 2002/0150799 A1 | | 10/2002 | Baumann et al. | |
| 2002/0168308 A1 | * | 11/2002 | Loffler et al. ............. | 422/211 |
| 2003/0224231 A1 | * | 12/2003 | Penev ....................... | 429/24 |
| 2004/0101721 A1 | * | 5/2004 | Yoshida et al. ............ | 429/20 |

FOREIGN PATENT DOCUMENTS

| | | | |
|---|---|---|---|
| EP | 1458044 A1 | | 9/2004 |
| JP | 62052320 A | * | 3/1987 |
| JP | 63155564 A | * | 6/1988 |
| JP | 2-002878 | | 1/1990 |
| JP | 5-208133 | | 8/1993 |
| JP | 2000-007301 A | | 1/2000 |
| JP | 2001201046 A | * | 7/2001 |
| JP | 2002-319416 | | 10/2002 |

OTHER PUBLICATIONS

European Search Report relating to European Patent Application Publication EP 1458044 A1 (search completed Sep. 15, 2003).

* cited by examiner

*Primary Examiner*—Gregg Cantelmo
(74) *Attorney, Agent, or Firm*—Kratz, Quintos & Hanson, LLP.

(57) ABSTRACT

The object is to provide a simplified but highly efficient fuel cell system, permitting to perform the flame off detection and so on without supplying the burner with additional raw fuel, even if a flame rod system flame detection means is adopted as burner for reformer. The invention concerns a fuel cell system, comprising a reformer for reforming a hydrocarbon base fuel such as natural gas into hydrogen, a CO transformer, a CO eliminator, a fuel cell for generating electricity from hydrogen, and a burner for reformer for burning hydrogen gas discharged from the fuel cell and supply the reformer with heat necessary for reforming reaction, wherein the burner for reformer is provided with a flame rod system flame detection means and, at the same time, supplied with hydrogen gas containing a flame detectable amount of fuel gas.

3 Claims, 3 Drawing Sheets

Reforming gas temperature dependency of methane concentration in the process gas at S/C = 3.0

Reforming gas temperature dependency of methane concentration in the process gas at S/C = 2.5

FUEL CELL SYSTEM HAVING A BURNER WITH A FLAME DETECTION ROD THEREIN

BACKGROUND OF THE INVENTION

1. Field of the Invention

The present invention concerns a fuel cell system.

2. Detailed Description of the Prior Art

Of latest years, a fuel cell system, comprising a reformer for reforming a hydrocarbon base fuel including natural gas, city gas, methanol, LPG, butane and so on as raw fuel into hydrogen, a CO transformer for transforming carbon monoxide, a CO eliminator for removing carbon monoxide, a fuel cell for generating electricity from hydrogen, and a burner for reformer for burning hydrogen gas discharged from the fuel cell and supply the reformer with heat necessary for reforming reaction, or a fuel cell system as small power supply comprising further a process gas burner burning hydrogen until each reactor stabilizes during the start or stop, have been proposed.

FIG. 5 is a system diagram showing a fuel cell system of the prior art.

A fuel cell system GS using a fuel cell 6 comprises a heat recovery unit RD in addition to the fuel cell 6.

The heat recovery unit RD is linked by a hot water circuit or the like comprising a hot water storage tank 50, heat exchangers 32, 46, 71 and pumps 33, 47, 72.

The fuel cell 6 is provided with a fuel gas supply unit comprising a desulfurizer 2, a reformer 3, a CO transformer 4, a CO eliminator 5 and so on, a reaction air supply unit comprising an air pump 11, a water pump 21 and so on, electrodes such as fuel electrode 6a, air electrode 6k and so on, and a refrigeration unit of the fuel cell 6 comprising a water tank 21, a pump 48, a refrigeration section 6c and so on.

Electricity generated by the fuel cell 6 is boosted by a DC/DC converter and connected to the main power through a distribution system link inverter (not shown). On the other hand, the power is supplied from here as power of other electric apparatus such as lighting, air conditioner, in a house, office, and so on.

The fuel cell system GS using such a fuel cell 6 intends to use efficiently the energy held by the fuel used for the fuel cell 6, for example, by producing hot water from the city water using heat generated during the power generation by the fuel cell 6 at the same time as the power generation, storing the hot water in a hot water storage tank 50 and supplying to the bath, kitchen and so on.

In the fuel gas supply unit of the aforementioned fuel cell system GS, natural gas, city gas, methanol, LPG, butane or other raw fuel 1 supplied to a desulfurizer 2, and here, sulfur component is removed form the raw fuel.

When the raw fuel having passed through the desulfurizer 2 is boosted up by a booster pump 10 and delivered to the reformer 3, hot water is sent from a water tank 21 through a water pump 22 and heated by the heat exchanger 17 to generate water vapor, and they meet before being supplied. A reformed gas containing hydrogen, carbon dioxide, and carbon monoxide is produced in the reformer 3. Gas having passed through the reformer 3 is supplied to the CO transformer 4, and here, carbon monoxide contained in the reformed gas is transformed into carbon dioxide. Gas having passed through the CO transformer 4 is supplied to the CO eliminator 5 and here, untransformed carbon monoxide in the gas having passed through the CO transformer 4 is reduced, for instance, equal or inferior to 10 ppm (volume) and aqueous gas (reformed gas) of high hydrogen concentration is supplied to a fuel electrode 6a of the fuel cell 6 through a pipe 64.

At this time, the moisture addition amount to the reformed gas is adjusted by regulating the amount of hot water supplied from the water tank 21 to the reformer 3.

The reaction air supply unit humidifies by supplying air from the air pump 11 to the water tank 21, and delivering to a gas phase 53 all the way frothing up reaction air in the hot water in the water tank 21.

Thus, the reaction air after humidification so as to maintain the reaction properly in the fuel cell 6 is supplied to the air electrode 6k of the fuel cell 6 from the water tank 21 through the pipe 25.

In the fuel cell 6, power is generated by electrochemical reaction of hydrogen in the reformed gas supplied to the fuel electrode 6a and oxygen in the air supplied to the air electrode 6k though the gas phase 53 of the air pump 11 and the water tank 21.

The refrigeration unit of the fuel cell 6 is a refrigeration unit placed side by side with the electrodes 6a, 6k of the fuel cell 6, in order to prevent the fuel cell 6 from overheating due to reaction heat or the like of the electrochemical reaction, and designed to circulate hot water of the water tank 21 in a refrigeration section 6c as cooling water by a pump 48, and controls to maintain the temperature in the fuel cell 6 to a temperature appropriate for power generation (for instance, to the order of 70 to 80° C.) by the cooling water.

The chemical reaction in the reformer 3 being endoergic, it has a burner for reformer 12 to sustain the chemical reaction by heating, which is supplied with raw fuel through the pipe 13, supplied with unreacted hydrogen passing through the fuel electrode 6a, through the pipe 15, and supplied with air through a fan 14. When the present fuel cell system GS starts, raw fuel is supplied to the burner for reformer 12 through the pipe 13 and burned, and when the temperature of the fuel cell 6 stabilizes, after the starting, the supply of raw fuel from the pipe 13 is reduced, and unreacted hydrogen (off-gas) discharged from the fuel electrode 6a is supplied through the pipe 15 to sustain the combustion.

On the other hand, the chemical reaction in the CO transformer 4 and the CO eliminator 5 is exothermic. The refrigeration control is performed, during the operation, so that the temperature does not exceed the reaction temperature by the heat of the exothermic reaction. Thus, these predominated chemical reaction and power generation are sustained in reformer 3, the CO transformer 4, the CO eliminator 5 and the fuel cell 6.

Heat exchangers 18, 19 are connected respectively between the aforementioned reformer 3 and the CO transformer 4, and, the CO transformer 4 and the CO eliminator 5. And, how water of the water tank 21 circulates in respective heat exchangers 18, 19 through the pumps 23, 24, and these hot waters cool respectively the gas having passed through the reformer 3 and the CO transformer 4. Though not illustrated, it is also possible to connect a heat exchanger between the CO eliminator 5 and the fuel cell 6 for cooling gas having passed through the CO eliminator 5.

A heat exchanger 17 is connect to an exhaust system 31 of the aforementioned reformer 3 and, when hot water from the water tank 21 is supplied through the pump 22, it is vaporized by the heat exchanger 17, and the water vapor is mixed with the raw fuel and supplied to the reformer 3.

The present fuel cell system GS is provided with a process gas burner (PG burner) 34.

When the fuel cell system GS starts, the composition of the reformed gas having passed through the reformer 3, CO transformer 4 and CO eliminator 5 has not attained a stable specified value appropriate for operating the fuel cell 6, and it is impossible to supply the fuel cell 6 with the gas, until it stabilizes. There, until the stabilization of respective reactor, the gas whose gas composition has not attained the specific value is introduced in the PG burner 34 and burned.

37 is a fan for delivering combustion air to the PG burner 34.

Then, when respective reactor stabilizes and the CO concentration in the gas has attained the specific value (for instance, equal or inferior to 10 ppm (volume)), it is introduced in the fuel cell 6 for power generation. Unreacted gas that could not be used for power generation in the fuel cell 6 is introduced initially in the PG burner 34 and burned and, when the temperature of the fuel cell 6 stabilizes, off-gas from the fuel cell 6 is introduced in the burner 12 of the reformer 3 through the pipe 15 and burned.

In other words, after the start of the fuel cell system GS, an on-off valve 91 is closed until the temperature stabilization of respective reactor, and the reformed gas is supplied to the PG burner 34 through a pipe line 35 and an on-off valve 36.

In case of temperature stabilization of respective reactor, now the on-off valve 91 is opened while the on-off valve 92 is closed, until the temperature of the fuel cell 6 stabilizes in a temperature range near the operation temperature (for instance 70 to 80° C.), and the reformed gas is supplied to the PG burner 34 through a pipe line 38 and an on-off valve 39, and burned there.

In case where the temperature of the fuel cell 6 stabilizes at the operation temperature, and power is generated continuously, the on-off valves 91, 92 are opened while the on-off valves 36, 39 are closed, and unreacted gas (off-gas) having passed through the fuel cell 6 is supplied to the burner for reformer 12 through a pipe line 15.

The hot water storage tank 50 is supplied with city water though a water pipe 61. The city water supplied to the hot water storage tank 50 is heated by exhaust heat generated from the fuel cell system GS, and the hot water risen in temperature is supplied outside through a hot water supply pipe 62.

For instance, another heat exchanger 32 is further connected to the exhaust system 31, in addition to the heat exchanger 17, and water of the hot water storage tank 50 circulates in the heat exchanger 32, through a pump 33, for exhaust heat recovery.

Also, a heat exchanger 46 is connected to an exhaust system 45 of the PG burner 34 and, water of the hot water storage tank 50 circulates in the heat exchanger 46, through a pump 47, for heat recovery.

Water returning through the heat exchangers 18, 19 by the pumps 23, 24, 48 and cooling water circulating in the refrigeration section 6c of the fuel cell 6 flow in the water tank 21 through a water pipe 73 and, on the other hand, a water supply unit 68 for supplying the water tank 21 with water is connected.

The water supply unit 68 is comprised of an electric motor operated valve 56, a supply tank 67, a pump 74 and so on. The supply tank 67 is a tank for storing temporarily through a pipe 70 water generated from a city water supply unit 69 and the fuel cell 6 for permitting to supply the water tank 21 with water.

Water generated from the fuel cell 6 includes, for instance, drain water obtained by conducting gas discharged from the air electrode 6k of the fuel cell 6 into the heat exchanger 71 and cooling the inside of the heat exchanger 71 with water circulating between the hot water storage tank 50 by the pump 72 or water contained in the gas discharged from the fuel electrode 6a.

The city water supply unit 69 is connected to a water source 78 through a water pipe 52 having an electric motor operated valve 76 and when a water level gauge 79 detects the lowering of water level due to the reduction of water quantity in the supply tank 67, a liquid level control unit 77 opens the electric motor operated valve 76, and replenishes the supply tank 67 with water through the water pipe 52 and a water treatment unit (ion exchange resin) 51 using the water pressure of the water source 78, in order to retain a water quantity that would not impede the supply of the water tank 21 with water.

The water tank 21 has a liquid level control unit LC for keeping the level of water so as to form an air portion (gas phase) 53 all the time in the upper part in the tank and a temperature control unit TC for keeping the water temperature in the water tank 21 within the set range.

The liquid level control unit LC comprises a water level gauge 54 and a control unit of an electric motor operated valve 56 for monitoring the water quantity in the water tank 21 all the time, stores water in the tank so that reaction air is humidified moderately when it passes in the water tank 21 and supplied to the fuel cell 6, and controls the water quantity so as to form the gas phase 53 in the upper part, operates the pump 74 in case of lowering of the water level, introduces treated water from the supply tank 67 through a pipe 84 by adjusting the opening of the electric motor operated valve 56, for keeping the water level in the water tank 21 within the set range.

55 is a wave-eliminating board for preventing the level detection by the water level gauge 54 from becoming unstable due to frothing and so on.

The temperature control unit TC is an unit for keeping the water temperature in a temperature range of, for instance, 60 to 80° C. (set temperature) so as to realize a moderate humidification in the water tank 21, when the air electrode 6k of the fuel cell 6 is supplied with reaction air. 63 is a perforated board for bubbling.

SUMMARY OF THE INVENTION

The flame detection means for detection of flame off and so on, such as survey or control of a stable combustion, in the burner for reformer 12 or the process gas burner 34 of the fuel cell system GS as mentioned above includes a method of measuring directly the temperature by a thermocouple, a flame rod system of ionizing hydrocarbon by applying an alternating voltage in the flame and measuring a minute current flowing towards the burner, and so on.

In the flame off detection by the thermocouple, the flame temperature is measured directly and the flame off is judged from its temperature change, requiring a detection time (judgment time) of several seconds from the flame off, deteriorating the response to the flame off and, moreover, increasing the cost and, on the other hand, in case of sheath type thermocouple, larger is the diameter of the sheath, lower is the response to the temperature change, imposing to use a thermocouple of small diameter; however, the sheath protection material is eroded and, especially, a sheath type thermocouple of 0.5 mm in diameter breaks when exposed to an open flame, deteriorating the durability.

On the other hand, flame detection by the flame rod system is a relatively simple method used for gas combustion flame detection. If a circuit for applying an alternating voltage to a flame rod, taking out and amplifying a direct current generated by rectification due to the flame rectifying effect, and opening a fuel valve by operating a relay is created, the same can be used as safety device. However, as the flame rectifying effect is generated by ionization of hydrocarbon in the fuel, and a sufficient current does not flow in case of lack of hydrocarbon in the fuel or in case of low concentration of hydrocarbon in the fuel, inhibiting the use of the method in these cases.

There, in case of using a flame rod system flame detection means, it was necessary to supply unreacted gas (off-gas) discharged from the fuel electrode 6a through the pipe 15, when the temperature of the fuel cell 6 had stabilized, after the starting, and additionally supply raw fuel from the pipe 13. Additional supply of raw fuel from the pipe 13 decreases the efficiency, and complicates the system.

It is an object of the present invention to provide a fuel cell system, making unnecessary to supply the burner with additional raw fuel, even when the flame rod system which is a relatively simple system is adopted as fuel detection means of the burner for reformer 12 and the process gas burner 34 of a fuel cell system GS, allowing to monitor and control the stable combustion and detect flame off in the burner and moreover, permitting to simplify the system and assure a high efficiency.

The fuel cell system of claim 1 of the present invention for solving the problems is a fuel cell system, comprising a reformer for reforming a hydrocarbon base fuel into hydrogen, a CO transformer for transforming carbon monoxide, a CO eliminator for removing carbon monoxide, a fuel cell for generating electricity from hydrogen, and a burner for reformer for burning hydrogen gas discharged from the fuel cell and supply the reformer with heat necessary for reforming reaction, wherein:

the burner for reformer is provided with a flame rod system flame detection means and, at the same time, supplied with hydrogen gas containing a flame detectable amount of fuel gas.

The fuel cell system of claim 2 of the present invention for solving the problems is a fuel cell system, comprising a reformer for reforming a hydrocarbon base fuel into hydrogen, a CO transformer for transforming carbon monoxide, a CO eliminator for removing carbon monoxide, a burner burning hydrogen for exhaust heat recovery without supplying to the fuel cell until each reactor stabilizes during the start or stop, a fuel cell for generating electricity from hydrogen, and a burner for reformer for burning hydrogen gas discharged from the fuel cell and supply the reformer with heat necessary for reforming reaction, wherein:

the each burner is provided with a flame rod system flame detection means and, at the same time, supplied with hydrogen gas containing a flame detectable amount of fuel gas.

The fuel cell system provided with flame rod system flame detection means of claim 3 of the present invention is the fuel cell of claim 1 or 2, wherein the reforming catalyst used for the reformer is a precious metal base reforming catalyst composed at least of Ru and/or Rh.

The fuel cell system provided with flame rod system flame detection means of claim 4 of the present invention is the fuel cell of claim 3, wherein the fuel gas concentration in the outlet gas of the reformer is 3 to 16% in volume.

And the fuel cell system provided with flame rod system flame detection means of claim 5 of the present invention is the fuel cell system of any one of claims 1 to 4, wherein the fuel gas concentration in the hydrogen gas discharged from the fuel cell is 7 to 33% in volume.

BRIEF DESCRIPTION OF THE DRAWINGS

These and other objects and advantages of the present invention will become clear from the following description with reference to the accompanying drawings, wherein.

[Symbols]

Figure 1:
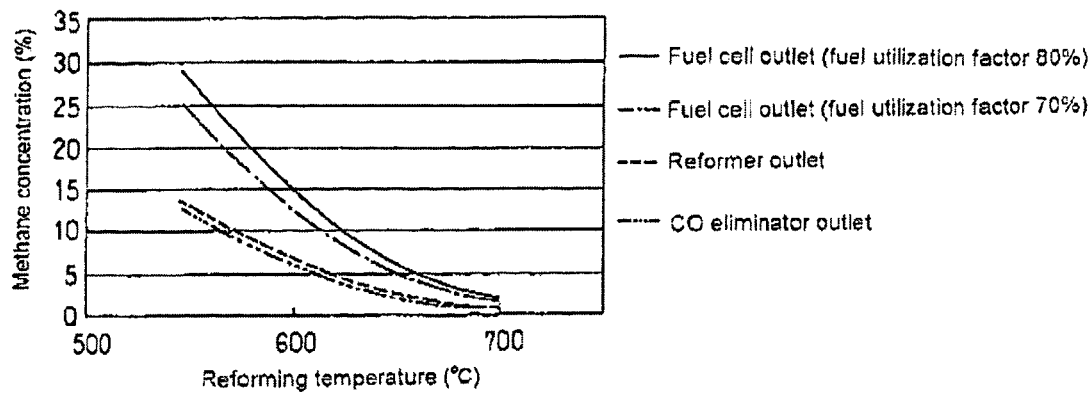
FIG. 1 shows the methane concentration (%) in the process gas at S/C=3.0.

| 3 | Reformer |
|---|---|
| 4 | CO transformer |
| 5 | CO eliminator |
| 6 | Fuel cell |
| 12 | Burner for reformer |
| 34 | Process gas burner |
| 100 | Burner |
| 101 | Burner head |
| 103 | Flame detection rod |
| GS | Fuel cell system |

DETAILED DESCRIPTION OF THE PREFERRED EMBODIMENT

Now, embodiments of the present invention shall be described in detail.

In the following description, tables and drawings, the gas concentration is expressed in % and ppm, and they represent respectively % in volume and ppm in volume.

Conventionally, the reforming temperature of the reformer 3 using methane as fuel gas is equal or superior to 700° C., while the equilibrium gas composition of 700° C. is as shown in Table 1, at S/C (steam/carbon ratio)=3 and 4.

TABLE 1

| S/C | 3 | 4 |
|---|---|---|
| Reforming temperature ° C. | 700 | 700 |
| DRY % | | |
| $H_2$ % | 76.8 | 77.6 |
| CO % | 12.8 | 10.4 |
| $CO_2$ % | 9.6 | 11.9 |
| $CH_4$ % | 0.77 | 0.33 |

The process gas of the composition shown in Table 1 is reduced to 1% or less in CO by the CO transformer 3 and to 10 ppm or less by CO eliminator 5. In the CO eliminator 5, CO is removed by selective oxidation of CO, with minimum consumption (combustion) of hydrogen in the gas, by adding air in front of the reactor (CO selective oxidation). However, at this time, some methanation progresses as side reaction, consuming hydrogen and producing methane. The production amount of methane will be different according to air input quantity and catalyst reactivity, but the methane concentration at the CO eliminator 5 exit is on the order of 1.5% (at most 2% to 3%). The process gas is consumed in hydrogen by the fuel cell 6 and, when the fuel utilization factor (Uf) is 70%, 70% of hydrogen amount are consumed and the remaining 30% will be discharged from the fuel cell 6. Consequently, the total gas quantity decreases by the reduction amount of consumed hydrogen, and the methane concentration increases (about 2 to 3%). The gas is burned by the burner 12 as heating medium necessary for reforming reaction of the reformer 3, so as to supply the reforming catalyst with heat.

In the conventional hydrogen production plant, nickel alumina catalyst has been used as reforming catalyst from the viewpoint of cost. However, as the fuel cell is required to be compact and assure a higher performance, catalysts carrying precious metal types Ru, Rh of high caulking resistance and high activity on a support of alumina or zirconia can be used advantageously. Now, the reason precious metal type catalysts can be used advantageously shall be described.

In case of using a nickel alumina catalyst in the reformer 3 of the fuel cell 6, it has been operated with GHSV equal or inferior to the order of 500 h$^{-1}$, reforming temperature equal or superior to 700° C. (on the order of 800 to 900° C.) and equal or superior to S/C=3.5 to avoid caulking.

On the other hand, ruthenium alumina catalyst presents a higher activity and a higher caulking suppression effect than nickel alumina catalyst. In case of using the present catalyst, the outlet gas composition has attained the equilibrium gas composition, even if GHSV is on the order of 1000 h$^{-1}$, when the operation temperature (gas exit catalyst temperature) of the reformer 3 is normal 700° C. In addition, caulking is not confirmed on the order of S/C=2.0. The Inventors have found that an approximate equilibrium gas composition can be obtained in gas composition at the reformer 3 outlet, even when the reforming temperature, which is assumed normally to be equal or superior to 700° C., is reduced to the order of 550° C.

In the present invention, taking profit of the fact, a flame rod system flame detection means can be adopted for the burner 12, by increasing intentionally the residual methane concentration through the reduction of reforming temperature in the reformer 3, and using unreacted hydrogen containing residual methane whose concentration was increased and exiting from the fuel cell 6 as fuel of the burner for reformer 12, and it is unnecessary to supply the burner with additional raw fuel, even if the flame rod system flame detection means is adopted, allowing to simplify the system, and providing a highly efficient fuel cell system.

Figure 2:
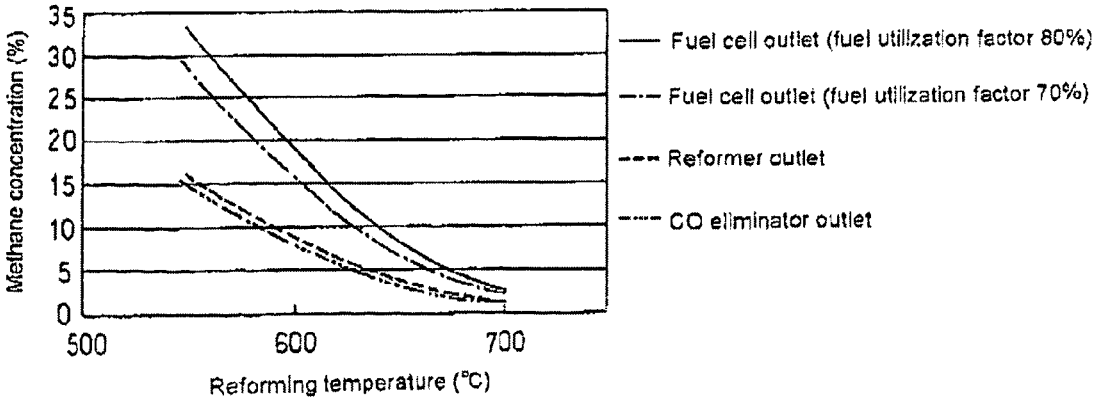
FIG. 2 shows the methane concentration (%) in the process gas at S/C=2.5.

FIG. 1 shows the methane concentration (%) in the process gas (reformer outlet, CO eliminator outlet, fuel cell outlet) at S/C=3.0; and FIG. 2 shows the methane concentration (%) in the process gas (reformer outlet, CO eliminator outlet, fuel cell outlet) at S/C=2.5.

From FIGS. 1 and 2, it can be understood that the reformer 3 outlet methane concentration increases, while the fuel cell 6 outlet methane concentration increases by lowering the reforming temperature. Thereby, it can be understood that the flame rod system flame detection means can be adopted, by lowering the reforming temperature.

In short, the methane concentration of the fuel cell 6 outlet gas becomes equal or superior to about 8%, if the reforming temperature of the reformer 3 is about 630° C. or less, in case of S/C=3.0, utilization factor 70%, and if the reforming temperature of the reformer 3 is about 640° C. or less, in case of S/C=3.0, utilization factor 80%. Under these conditions, the methane concentration of the reformer 3 outlet gas becomes about 3 to 4%.

The methane concentration of the fuel cell 6 outlet gas becomes equal or superior to about 8%, if the reforming temperature of the reformer 3 is about 650° C. or less, in case of S/C=2.5, utilization factor 70%, and if the reforming temperature of the reformer 3 is about 660° C. or less, in case of S/C=2.5, utilization factor 80%. Under these conditions, the methane concentration of the reformer 3 outlet gas becomes about 3 to 5%.

Thus, considering the methanation reaction in the CO eliminator 5, the residual methane concentration contained in unreacted hydrogen at the fuel cell 6 outlet can be made detectable by the flame rod system flame detection means, by adjusting the reforming temperature of the reformer 3 and the fuel utilization factor of the fuel cell 6.

In addition to make the concentration detectable by the flame rod system flame detection means, it is obviously necessary to fit the shape or installation position of the flame rod.

Figure 3:
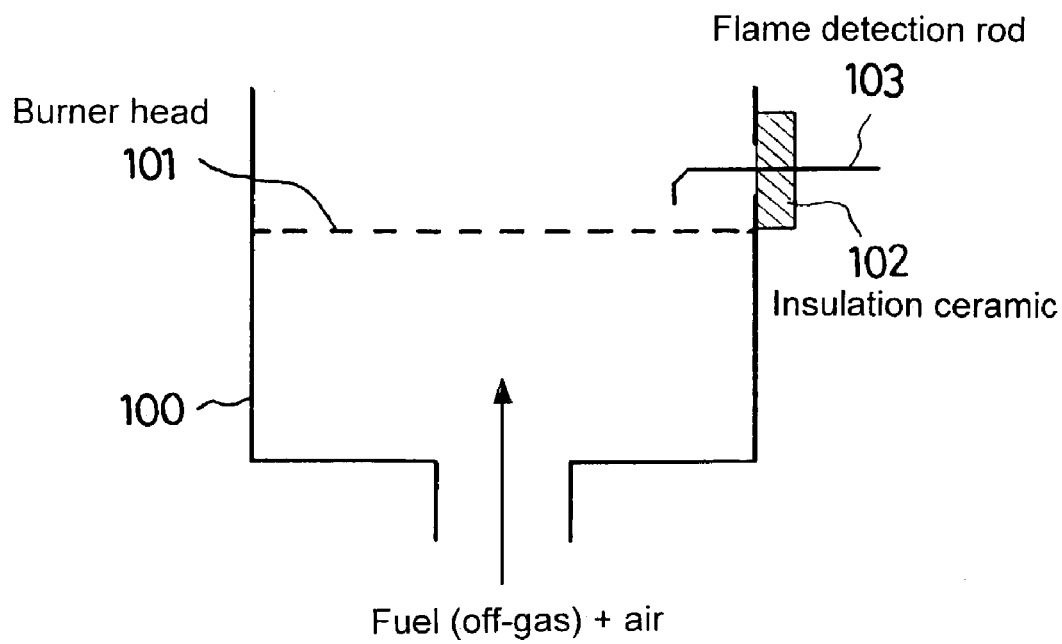
FIG. 3 illustrates an example of installation of the flame rod system flame detection means in a burner.
Figure 4:
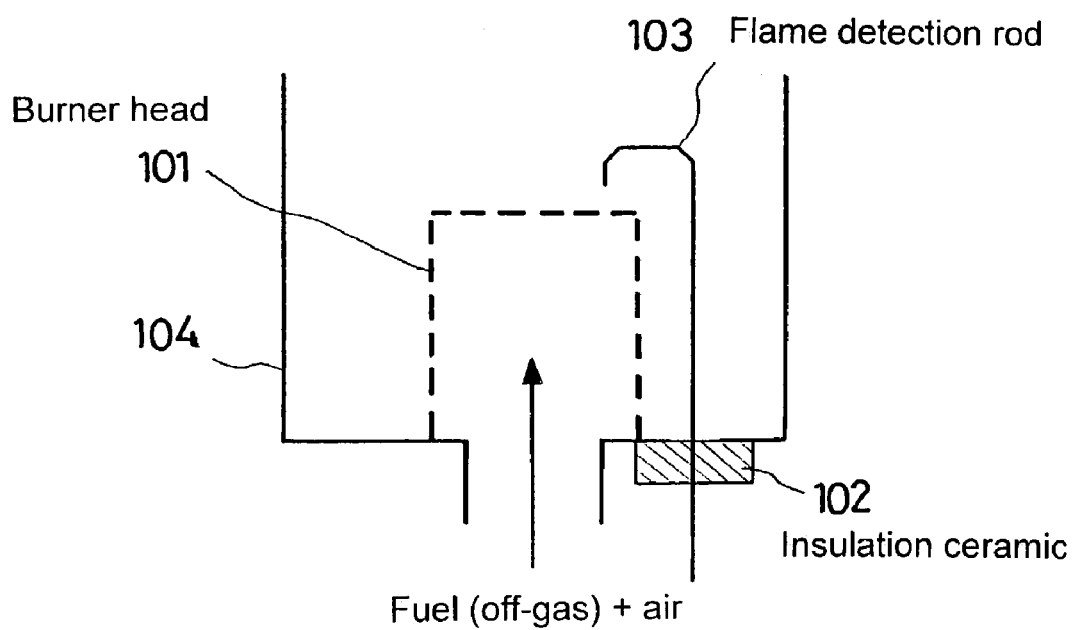
FIG. 4 illustrates an example of installation of the flame rod system flame detection means in another burner.
Figure 5:
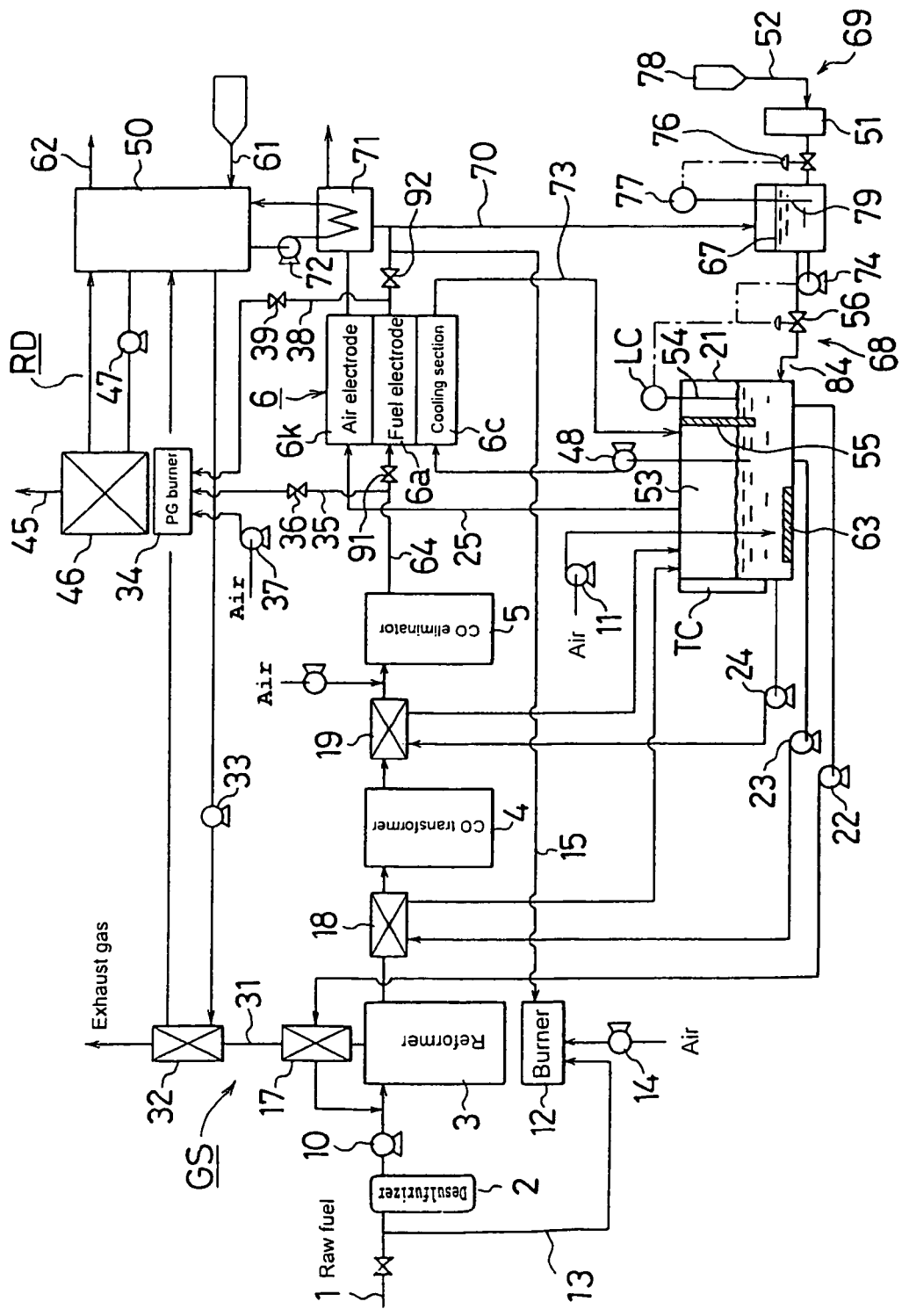
FIG. 5 is a system diagram showing a fuel cell system of the prior art.

FIG. 3 illustrates an example of installation of the flame rod system flame detection means in a burner, while FIG. 4 illustrates an example of installation of the flame rod system flame detection means in another burner.

In FIG. 3, an insulation ceramic 102 is fixedly installed on the wall surface of a burner 100 in the vicinity of a burner head 101 slightly downstream than a burner head 101 of a burner 100, a flame detection rod 103 is mounted through the insulation ceramic 102, while a tip portion of the flame detection rod 103 is fixed to be placed proximally to the burner head 101. There, it is so made to apply an alternating current 100V between a metal portion in conduction with the burner head 101 and the flame detection rod 103, and measure a minute current flowing therebetween.

In FIG. 4, an insulation ceramic 102 is fixedly installed on the wall surface of the bottom of a burner 104, a flame detection rod 103 is mounted through the insulation ceramic 102, while a tip portion of the flame detection rod 103 is fixed to be placed proximally to the top face of the burner head 101. There, it is so made to apply an alternating current 100V between a metal portion in conduction with the burner head 101 and the flame detection rod 103, and measure a minute current flowing therebetween.

A flame detectable methane concentration can be obtained, by increasing the fuel utilization factor of the fuel cell 6 to 80% or more, even if the reforming temperature of the reformer 3 is set to 660° C. or more (in case of S/C=2.5), but in this case, the fuel passage of the fuel cell 6 may be clogged with water, thereby, causing the fuel lack due to creating water drops.

In addition, in case of setting to S/C=2.5 or less, the water vapor quantity may decrease due to control deviation, and in such a case, S/C decreases sometimes temporarily less than the set value, provoking caulking.

Hence, in view of safety, S/C is designed preferably to 2.5 or more, and considering the whole, the reforming temperature is preferably set to 660° C. or less.

In addition, the heat supply quantity for evaporation of water required for the reformation is reduced, by lowering S/C; however, in case of the same reforming temperature, CO concentration in reformed gas increases, creating a large load in the CO reduction section, and requiring to oversize the CO reduction section.

On the other hand, by lowering the reforming temperature, CO concentration decreases, making unnecessary to oversize the CO reduction section. In case of S/C=3.0, it is unnecessary to oversize the CO reduction section, if the reforming temperature is set to the order of 640° C. or less, and from the point of CO concentration, the reforming temperature is preferably the order of 640° C. or less.

Consequently, the reforming temperature is 550 to 660° C., desirably on the order of 600 to 640° C.

Table 2 shows the relation between reformer temperature (° C.) and methane concentration (%) in the gas at the reformer 3 outlet and fuel cell 6 outlet in case of S/C=3.0.

Table 3 shows the relation between reformer temperature (° C.) and methane concentration (%) in the gas at the reformer 3 outlet and fuel cell 6 outlet in case of S/C=2.5.

TABLE 2

| Reformer temperature and methane concentration (S/C = 3.0) | | | |
| --- | --- | --- | --- |
| Reformer temperature ° C. | 550 | 800 | 840 |
| Reformer outlet % | 13 | 7 | 3 |
| Fuel cell outlet % (Fuel utilization factor 80%) | 28 | 15 | 7 |

TABLE 3

Reformer temperature and methane concentration (S/C = 2.5)

| Reformer temperature ° C. | 550 | 600 | 640 | 660 |
|---|---|---|---|---|
| Reformer outlet % | 16 | 9 | 5 | 3 |
| Fuel cell outlet % (Fuel utilization factor 80%) | 33 | 19 | 10 | 7 |

From Tables 2 and 3, it can be understood that the methane concentration (fuel gas concentration) in the outlet gas of the reformer 3 is 3 to 16%, and the methane concentration (fuel gas concentration) in the unreacted hydrogen gas discharged from the fuel cell 6 is 7 to 33%.

It should be appreciated that the description of the aforementioned embodiment is only for the explanation of the present invention and does not intend to define the invention described in appended claims, nor reduce the scope thereof. Moreover, the respective part composition of the present invention is not limited to the aforementioned embodiment, but a variety of modifications can be made without departing from the technical scope of the appended claims.

EMBODIMENTS

Now, the present invention shall be described more in detail in reference to embodiments and comparative examples, but the present invention shall not be limited to these embodiments.

Embodiments 1 to 3

Table 4 shows together results of operation of the fuel cell system GS of the present invention, supplying only unreacted hydrogen gas, without supplying additional raw fuel to the burner for reformer 12 provided with a flame rod system flame detection means, under the conditions shown in Table 4.

COMPARATIVE EXAMPLES 1 TO 4

Table 4 shows together results of operation of the fuel cell system GS for comparison, supplying only unreacted hydrogen gas, without supplying additional raw fuel to the burner for reformer 12 provided with a flame rod system flame detection means or a thermocouple, under the conditions shown in Table 4.

In the Embodiments 1 to 3, flame can be detected by the flame rod system flame detection means (about 2 to 5μ ampere was detected with 100V alternating current applied voltage).

On the other hand, in the Comparative examples 1, 2 and 4, it was extremely difficult to detect flame by the flame rod system flame detection means, because methane concentration is low, and a stable current could not be obtained. Additional mixing raw material from a line 13 was required for obtaining a stable current.

On the other hand, in the Comparative example 3 adopting the thermocouple system, it was possible to detect flame by the temperature; however, the use of sheath type thermocouple made of incoloy of 0.5 mm in diameter was extremely expensive, and even an incoloy made of heat resistant superalloy, when exposed to an open flame, broke by about 350 hours, making impossible to detect the flame.

The fuel cell system of claim 1 of the present invention is a fuel cell system, comprising a reformer for reforming a hydrocarbon base fuel into hydrogen, a CO transformer for transforming carbon monoxide, a CO eliminator for removing carbon monoxide, a fuel cell for generating electricity from hydrogen, and a burner for reformer for burning hydrogen gas discharged from the fuel cell and supply the reformer with heat necessary for reforming reaction, wherein:

the burner for reformer is provided with a flame rod system flame detection means and, at the same time, supplied with hydrogen gas containing a flame detectable amount of fuel gas, hence, making unnecessary to supply the burner for reformer with additional raw fuel and allowing to monitor, control and so on a stable combustion in the burner for reformer and detect flame off and so on and, moreover, permitting to make the system simpler and easier and having a remarkable effect of being capable of providing a fuel cell system of high durability, high efficiency and high reliability.

As it is unnecessary to supply the burner for reformer with additional raw fuel, the thermal balance is prevented from being not kept and the efficiency from lowering, allowing to simplify the system.

Different from the thermocouple system, which is expensive and problematic in durability, the flame rod system flame detection means is cheap and highly reliable.

The fuel cell system of claim 2 of the present invention is a fuel cell system, comprising a reformer for reforming a hydrocarbon base fuel into hydrogen, a CO transformer for transforming carbon monoxide, a CO eliminator for removing carbon monoxide, a burner burning hydrogen for exhaust

TABLE 4

| | Embodiment 1 | Embodiment 2 | Embodiment 3 | Comparative example 1 | Comparative example 2 | Comparative example 3 | Comparative example 4 |
|---|---|---|---|---|---|---|---|
| S/C | 3.0 | 3.0 | 2.5 | 4.0 | 3.0 | 3.0 | 3.0 |
| GHSV (br-1) | 1000 | 1000 | 1000 | 1000 | 1000 | 1000 | 1000 |
| Raw material | Natural gas | Natural gas | Natural gas | Natural gas | Natural gas | Natural gas | Natural gas |
| Reforming catalyst | 2% ruthenium alumina | 2% ruthenium alumina | 2% ruthenium alumina | Nickel alumina | 2% ruthenium alumina | 2% ruthenium alumina | 2% ruthenium alumina |
| Reformer outlet catalyst temperature (° C.) | 620 | 620 | 620 | 700 | 700 | 700 | 700 |
| CO transformer outlet catalyst temperature (° C.) | 200 | 230 | 230 | 200 | 200 | 200 | 200 |
| $O_2$/CO (air input quantity into CO eliminator) | 2.0 | 1.5 | 1.5 | 3.0 | 1.5 | 1.5 | 2.0 |
| Fuel utilization factor of fuel cell (%) | 70 | 80 | 80 | 70 | 70 | 70 | 80 |
| Burner flame detection means | Flame rod | Flame rod | Flame rod | Flame rod | Flame rod | Thermocouple | Flame rod |
| Cell outlet gas $CH_4$ temperature Dry (%) | 9.0 | 7.2 | 6.8 | 0.7 | 1.6 | 1.8 | 1.3 | heat recovery without supplying to the fuel cell until each reactor stabilizes during the start or stop, a fuel cell for generating electricity from hydrogen, and a burner for reformer for burning hydrogen gas discharged from the fuel cell and supply the reformer with heat necessary for reforming reaction, wherein:

each burner is provided with a flame rod system flame detection means and, at the same time, supplied with hydrogen gas containing a flame detectable amount of fuel gas, hence making unnecessary to supply respective burners with additional raw fuel, even when the flame rod system which is a relatively simple system, is adopted, and allowing to monitor, control and so on a stable combustion in respective burners and detect flame off and so on and, moreover, permitting to make the system simpler and easier, and at the same time, having a remarkable effect of capable of providing a fuel cell system of high durability, high efficiency and high reliability.

As it is unnecessary to supply respective burners with additional raw fuel, the thermal balance is prevented from being not kept and the efficiency from lowering, allowing to simplify the system.

Different from the thermocouple system, which is expensive and problematic in durability, the flame rod system flame detection means is cheap and highly reliable.

The fuel cell system provided with flame rod system flame detection means of claim 3 of the present invention is dependent on the fuel cell of claim 1 or 2, wherein the reforming catalyst used for the reformer is a precious metal base reforming catalyst composed at least of Ru and/or Rh, hence, it has the same effects as the fuel cell system of claim 1 or 2, and at the same time, has a further remarkable effect of obtaining the equilibrium gas composition, even if GHSV is 1000 $h^{-1}$, and, in a low temperature range 700° C. or less, allows to reduce the size of the reformer, assures such a satisfactory caulking resistance that the caulking is absent even at S/C=3.5 or less, and improves the efficiency, while, in case of nickel base catalyst, the reaction rate is reduced if the reforming temperature was lowered, requiring to increase the catalyst quantity in order to obtain the equilibrium gas composition, impeding the improvement of GHSV, and moreover, the caulking required to maintain S/C=3.5 or more, and it was necessary to apply a great quantity of heat for the latent heat of vaporization of water vapor, resulting in the lowering of efficiency.

Furthermore, it has a remarkable effect of reducing the load to the CO eliminator, because the reduction of the reforming temperature by the use of a precious metal type reforming catalyst made of Ru and/or Rh lowers CO concentration.

The reduction of the reforming temperature by the use of a precious metal type reforming catalyst made of Ru and/or Rh elevates the fuel gas concentration in the gas at the reformer outlet, and in case when the fuel utilization factor of the fuel cell is 70%, the fuel gas concentration in the gas at the CO eliminator outlet (fuel cell inlet) elevates to about 3%, the fuel gas concentration in the unreacted hydrogen gas at the fuel cell outlet elevates to about 7%, and if a burner provided with the flame rod system flame detection means is supplied with the gas, monitoring or control and so on of a stable combustion in the burner or detection of flame off and so on can be performed without supplying the burner with additional raw fuel.

The fuel cell system provided with flame rod system flame detection means of claim 4 of the present invention is dependent on the fuel cell system of claim 3, wherein the fuel gas concentration in the outlet gas of the reformer is 3 to 16% in volume, hence, it has the same effects as the fuel cell system of claim 3, and at the same time, has a further remarkable effect of performing more securely, the monitoring, control and so on of a stable combustion in the burner or the detection of flame off and so on.

The fuel cell system provided with flame rod system flame detection means of claim 5 of the present invention is dependent on the fuel cell system of any one of claims 1 to 4, wherein the fuel gas concentration in the hydrogen gas discharged from the fuel cell is 7 to 33% in volume, hence, it has the same effects as the fuel cell system of claims 1 to 4, and at the same time, has a further remarkable effect of performing more securely, the monitoring, control and so on of a stable combustion in the burner or the detection of flame off and so on.

While the presently preferred embodiment of the present invention has been shown and described, it will be understood that the present invention is not limited thereto, and that various changes and modifications may be made by those skilled in the art without departing from the scope of the invention as set forth in the appended claims.

What is claimed is:

1. A fuel cell system, comprising
a reformer for reforming a hydrocarbon base fuel into hydrogen,
a CO transformer for transforming carbon monoxide,
a CO eliminator for removing carbon monoxide,
a fuel cell for generating electricity from hydrogen, and
a burner for the reformer for burning exclusively a gas containing hydrogen discharged from the fuel cell and for supplying said reformer with heat necessary for reforming reaction, said burner having a burner head receiving fuel and air from below, said burner having a wall surface on a bottom of said burner, said burner not receiving fuel and air through the wall surface on the bottom of said burner, the wall surface on the bottom of said burner being in contact with said burner head,
a flame rod type flame detection means detecting the flame of the burner for the reformer, said flame rod type flame detections means including an insulator installed on the wall surface on the bottom of said burner and including a flame detection rod mounted to pass through the insulator and through the wall surface on the bottom of said burner and through an area between another wall of said burner and said burner head, wherein:
said hydrogen gas discharged from the fuel cell contains residual methane from the reformer of 7 to 33% in volume, wherein:
a reforming catalyst used for the reformer is a precious metal base reforming catalyst, and
a means controlling a ratio of the steam supplied to the reformer and a carbon contained in the fuel (S/C) in the range of 2.5 or more to 3.5 or less and a means for controlling a temperature of the reformer from 550° C. to 640° C., and thereby
said gas containing hydrogen discharged from the fuel cell contains residual methane from the reformer of 7 to 33% in volume.

2. The fuel cell system of claim 1, wherein a reforming catalyst used for the reformer is a precious metal base reforming catalyst composed at least of Ru and/or Rh.

3. The fuel cell system of claim 2, wherein the methane concentration in an outlet gas of the reformer is 3 to 16% in volume.

* * * * *